Nov. 14, 1933.   E. B. MOORE   1,934,871
VALVE
Filed April 23, 1930
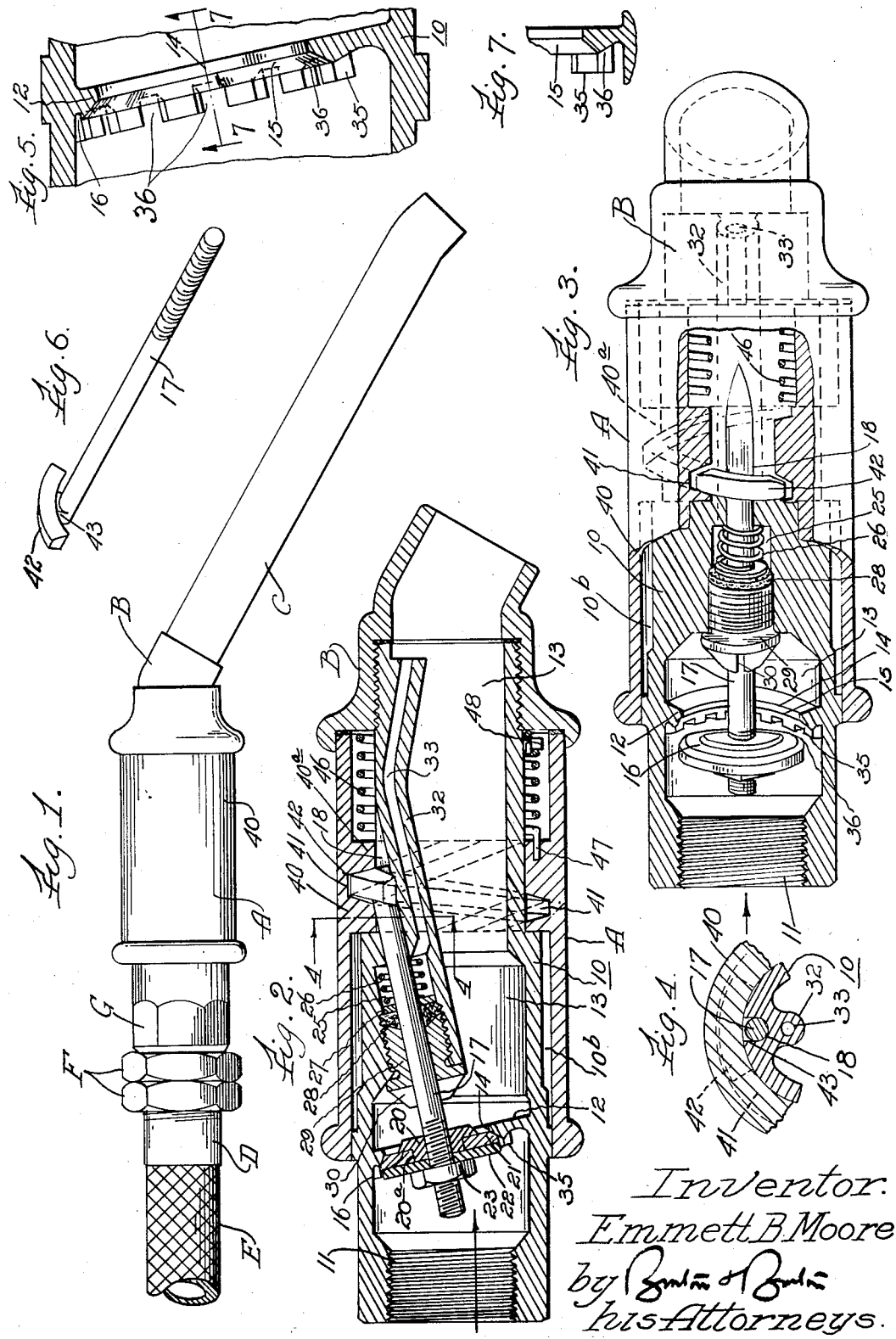
Inventor:
Emmett B. Moore.
by [signature]
his Attorneys.

Patented Nov. 14, 1933

1,934,871

UNITED STATES PATENT OFFICE 1,934,871

VALVE

Emmett B. Moore, Evanston, Ill.

Application April 23, 1930. Serial No. 446,500

8 Claims. (Cl. 251—132)

This invention relates to improvements in fluid valves, and more particularly to valves of the type in which the operating means is in the nature of a rotatable sleeve surrounding the fluid passageway. One of the objects is to provide an improved valve structure having means for automatically closing the valve when the sleeve is released from manual control. Another object is to provide an improved valve structure having spring means normally tending to maintain the valve closed, and manually operable means capable of actuation for positively moving the valve to full open or closed position independently of the said spring means. A further object is to arrange means for collecting and entraining back into the main fluid passageway any liquid which tends to seep out along the valve stem. And it is also an object of this invention to provide a valve of this general character which is simple, positive, compact and capable of quick actuation for accurately controlling the effective valve port opening. It consists in certain features and elements of construction, in combination, as herein shown and described, and as indicated by the claims.

In the drawing:—

Figure 1 is a side elevation of the valve structure embodying the present invention, shown connected to a hose and nozzle.

Figure 2 is a vertical axial section through the valve; the valve being shown in closed position.

Figure 3 is a top view of the valve with parts shown in section to illustrate details of construction; the valve being shown in opened position.

Figure 4 is a fragmentary sectional view taken as indicated at line 4—4 on Figure 2.

Figure 5 is a fragmentary sectional view of the valve seat taken at the same plane as Figure 2, but on a larger scale.

Figure 6 is a perspective view of the valve stem and follower element.

Figure 7 is a fragmentary detail section taken as indicated at line 7—7 on Figure 5.

For the purpose of illustration, the valve structure embodying the present invention is shown in connection with apparatus used for dispensing liquid, such as gasoline, and in this arrangement the valve, which is indicated generally at A, is shown provided at its discharge end with a fitting, B, to which is secured a downwardly inclined nozzle, C. The rear end of the valve structure is connected to the coupling, D, of a flexible hose, E, which coupling is screwed into the rear end of said valve structure and firmly secured thereto by a pair of lock nuts, F. The rear end of the valve casing is formed of polygonal outline, as shown at G, so as to facilitate engagement by a suitable wrench.

Referring now in detail to the drawing, the valve structure includes a main stationary inner member or housing, 10, of substantially cylindrical form, whose rear end is shown threaded at 11, for engagement with the coupling, D. Formed integrally with and adjacent the threaded portion, 11, is a wall, 12, extending slightly oblique to a plane perpendicular to the normal fluid passageway, 13, of said inner member; said wall is formed with a valve port, 14, having a tapered seat, 15, with which cooperates a valve element, 16, rigidly secured to the end of a reciprocatory stem, 17. The valve and stem are disposed obliquely to the fluid passageway, 13, with the end of the stem remote from the valve guided in the stationary inner member, 10, and extending exteriorly thereof, and longitudinally movable in an exteriorly exposed U-shaped groove, 18, formed in said inner member, as seen in Figure 2 of the drawing. The valve element includes a metal disk, 20, screwed onto the end of the stem, 17, and provided with a shoulder, 20ª, on which is seated the valve proper, indicated at 21, which may be understood to be formed of any suitable material, including rubber, fibre, composition, or metal, according to the nature of the material to be handled. A reenforcing plate, 22, engages the rear side of the valve element, 21, and the parts are held in assembled relation by the nut, 23, on the outer end of the stem.

The inner stationary member or housing, 10, may be a casting, formed with a cavity or chamber, 25, approximately concentric about the stem, in which is disposed a coil spring, 26, encompassing the valve stem and reacting between the bottom of the chamber, and a washer, 27, which engages suitable packing material as indicated at 28, for urging the same tightly against a convex or inwardly tapering end of a plug, 29, threaded into the outer end of the chamber, 25. The stem extends longitudinally through the chamber, 25, and is provided with additional support in the plug, 29. The packing thus tends to seal the chamber and prevent any seepage therein of the fluid which may leak along said stem through the plug, 29. The outer end of the plug is provided with a slot, 30, adapted to be engaged by a suitable tool, such as a screw driver, for securing it in the end of the chamber, 25.

Formed integrally on the inner wall of the stationary member and extending longitudinally thereof for a substantial distance forwardly of the chamber, 25, is a rib formation, 32, in which is provided a duct, 33, opening into the chamber, 25, at one end, while its opposite end opens for discharge substantially parallel to the passageway, 13, of said stationary member. It will be apparent that any of the liquid that seeps through the plug, 29, and the packing around the stem, 17, will tend to accumulate in the chamber, 25, and will then be drawn out through the duct, 33, by entrainment resulting from the suction created around the end of the duct, 33, by the velocity of the liquid discharging through the passageway.

However, it is to be understood that the packing merely serves in an auxiliary capacity and if desired may be dispensed with because the suction on the duct will continuously drain the liquid accumulating in the chamber, 25, and thus preclude leakage around the upper or outer end of the stem. This drain feature is of great importance, especially when the valve is employed to dispense liquid such as gasoline which tends to rapidly deteriorate most packing.

The transverse oblique wall, 12, in the interior of the stationary member is provided with an annular portion, 35, concentric with the valve port, 14, and facing at the inner side of said port relative to the direction of flow of liquid therethrough. This annular portion forms in effect a well in which the valve moves as it opens and which assists the valve in controlling the effective port opening. To insure against any "hammering action" when the valve approaches its seat and to obtain a positive control so that the valve may be caused to diminish the effective port opening gradually, this annular flange, 35, is provided with a series of circumferentially spaced notches, 36, as shown in Figure 5, so that as the valve enters the well the flow is limited to that which can get through the notches. These notches may be either rectangular or V-shaped. The bottom of each notch is inclined oppositely to the valve seat, 15, so as to direct the liquid back against the outer face of the valve, more or less counteracting the pressure of the liquid against the inner surface of the valve member and thus preventing this pressure from forcing the valve to closed position too suddenly.

Rotatably mounted on the stationary member, 10, is an operating sleeve, 40, which is formed with an internal annular part, 40ª, snugly telescoped onto the reduced forward end, 10ª, of the stationary member, said part, 40ª, having an internal spiral groove, 41, which is adapted to engage and cooperate with a follower or cam element, 42, rigidly associated with the outer or exposed end of the valve stem, 17, which extends exteriorly of the stationary member, as may be seen in Figure 2. Thus by rotating the sleeve, 40, the follower element, 42, is caused to shift the valve stem longitudinally for moving the valve toward or away from its seat. The stem and valve are held against rotation by the extreme end portion of the stem adjacent the follower, which is formed U-shaped in cross-section as indicated at 43, so as to fit snugly in the outwardly open U-shape groove, 18, in the stationary member. An intermediate portion of the inner stationary member, 10, is reduced in diameter as indicated at 10ᵇ, so as to provide an annular chamber between said part and the sleeve, thereby reducing the frictional contact areas between the sleeve and the stationary member. This annular chamber, 10ᵇ, formed by the reduction in diameter of the stationary portion has the further advantage of reducing the possibility of freezing of the parts together, which might result under certain climatic conditions where the exterior of the valve structure is subjected to severe cold and the fluid being dispensed through the valve is at a comparatively higher temperature.

Circumscribing the stationary member, 10, adjacent the forward end thereof in a chamber formed intermediate the sleeve and said stationary member is a coil spring, 46, one end of which is anchored in the sleeve, 40, as indicated at 47, the other end of which is rigidly secured to a projection, 48, on said stationary member. This spring is always under tension for yieldingly holding the valve seated, and exerts its force for rotating the sleeve in the direction for causing the spiral groove to move the stem, 17, and the valve element outwardly toward the seat. Thus when it is desired to open the valve the sleeve is rotated so as to cause the follower to travel rearwardly and move the valve against the direction of flow of fluid and against the reaction of the spring, 46. In so rotating the sleeve the tension in the spring, 46, is greatly increased so that immediately upon release of the sleeve the spring, 46, will rotate it reversely so as to cause the follower to retract the stem and move the valve to its seat.

The valve structure embodying the present invention has several pronounced advantages, especially when used in connection with apparatus for dispensing liquids of a volatile nature, such as gasoline, since the valve will at all times be held closed, except when under the manual control of an attendant; and as soon as the sleeve is released from manual restraint the valve is automatically closed by the spring, 46, thereby obviating the serious hazard of unintentional spillage of the gasoline. Furthermore, in the event that the discharge end of the hose to which the valve is connected is inadvertently dropped to the ground or struck against an object, the valve cannot be accidentally opened so as to cause discharge of the liquid. However, the arrangement is such that, if the spring, 46, should weaken or break, it will still be possible to fully close the valve manually by rotation of the sleeve, and without interference from the broken or inactive springs so that the nozzle will not be put out of service by this temporary defect.

I claim:

1. A valve structure of the character described, including a stationary inner member having a longitudinally extending fluid passageway, and a valve seat disposed obliquely to said passageway, a valve element controlling the flow through said seat, a stem rigidly secured to the valve element, and disposed obliquely of said passageway, said stem being supported for reciprocatory movement in the stationary member and having its extreme end portion exposed exteriorly of said stationary member, a follower on the exposed end of the stem, and a sleeve rotatably mounted on the stationary member and provided with a spiral internal groove engageable with said follower, whereby the rotation of the sleeve moves said stem and valve element toward or from its seat.

2. In the construction defined in claim 1, means for preventing rotation of said stem and valve element.

3. A valve structure of the character described, including a stationary inner member having a longitudinally extending fluid passageway, provided with a valve seat therein, a valve element for controlling the flow through the seat, a stem connected to the valve element and guided for reciprocatory movement in the inner member, said inner member being formed with a chamber surrounding a portion of the stem, a duct opening into the chamber having its other end opening into the passageway in the direction of flow of the fluid therein, a sleeve rotatably mounted on the inner member, and means interconnecting the sleeve and stem adapted to move the valve element toward or away from its seat in response to rotation of the sleeve.

4. In the construction defined in claim 3, the discharge opening of the duct terminating substantially parallel to the direction of fluid flow in the passageway.

5. A valve structure of the character described, including a stationary inner member having a longitudinally extending fluid passageway, and a valve seat disposed obliquely to said passageway, a valve element controlling said seat, a stem rigidly secured to the valve element and disposed obliquely of said passageway, said stem being supported for reciprocatory movement in the stationary member and having its extreme end portion exposed exteriorly of said stationary member, a portion of the stem and a portion of the exteriorly exposed groove in the inner member which provides guidance for the stem, being non-circular in cross-section to prevent rotation of said stem during reciprocatory movement, a follower on the outer end of the stem, and a sleeve rotatably mounted on the inner member and having an internal groove engageable by the follower, whereby rotation of the sleeve reciprocates the stem and moves the valve toward or from its seat.

6. In combination with a passage for fluid having a transverse partition with a port therein, a valve element controlling said port and arranged to open against the direction of flow of fluid in the passage, the surface of the partition adjacent the port being inclined to the axis of the port, trending against the direction of flow for diverting a portion thereof against the valve to oppose its closing movement.

7. In combination with a passageway for fluid having a transverse partition with a port therein, a valve element controlling said port and opening axially against the direction of flow, said partition including a well adjacent the port and encircling the valve when it stands in the vicinity of its seat, the wall of said well having notches which afford limited port capacity while the valve stands in the well, the bottom surfaces of said notches which face the direction of flow being inclined to the axis of the port trending against said direction of flow for diverting a portion of the fluid against the valve to oppose and cushion its movement in closing direction.

8. A valve structure of the character indicated including a stationary member provided with a valve seat therein and formed with a guideway, one end of which communicates with the exterior of said member, a valve element co-operating with said seat, an operating member connected to the valve element and reciprocably supported in guideway for moving the valve element toward or away from the seat, an intermediate portion of the guideway being enlarged to form a chamber, said stationary member being formed with a duct having one end opening in the chamber and the other end opening in the fluid passageway of said stationary member, packing material surrounding the operating member in said chamber, and a coil spring encompassing said operating member and engaging said packing, tending to prevent seepage of the fluid into the chamber.

E. B. MOORE.